(12) United States Patent
Chung (10) Patent No.: US 12,391,404 B2
(45) Date of Patent: Aug. 19, 2025

(54) VERTIPORT HAVING WIND GENERATOR, AND METHOD FOR LANDING AIRCRAFT USING THE SAME

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/640,537

(22) Filed: Apr. 19, 2024

(65) Prior Publication Data

US 2025/0214715 A1   Jul. 3, 2025

(30) Foreign Application Priority Data

Dec. 27, 2023 (KR) .......... 10-2023-0192626

(51) Int. Cl.
*B64F 1/22* (2024.01)
*F03D 9/43* (2016.01)
*H02K 7/18* (2006.01)

(52) U.S. Cl.
CPC .............. *B64F 1/22* (2013.01); *F03D 9/43* (2016.05); *H02K 7/183* (2013.01); *F05B 2240/911* (2013.01)

(58) Field of Classification Search
CPC ........... B64F 1/22; B64U 70/90; B64U 70/97; F03D 9/43; H02K 7/183
See application file for complete search history.

(56) References Cited

U.S. PATENT DOCUMENTS

| | | | |
|---|---|---|---|
| 5,998,882 A * | 12/1999 | Alston | F03D 9/22 |
| | | | 60/226.1 |
| 7,380,751 B1 * | 6/2008 | Henson | F03D 9/12 |
| | | | 244/1 R |
| 8,378,518 B2 * | 2/2013 | Khavari | F03D 13/20 |
| | | | 290/55 |
| 9,359,997 B2 * | 6/2016 | Toh | F03D 9/00 |
| 9,784,244 B1 * | 10/2017 | Souryal | H02K 7/1838 |
| 9,970,419 B1 * | 5/2018 | Souryal | F03D 1/04 |
| 10,220,861 B2 * | 3/2019 | Boukari | B61L 27/40 |
| 10,253,759 B2 * | 4/2019 | Souryal | H02K 7/1838 |
| 10,938,275 B2 * | 3/2021 | Glatfelter | F03D 3/002 |

(Continued)

FOREIGN PATENT DOCUMENTS

| | | |
|---|---|---|
| CN | 210047636 U | 2/2020 |
| CN | 211417634 U * | 9/2020 |

(Continued)

*Primary Examiner* — Philip J Bonzell
(74) *Attorney, Agent, or Firm* — Slater Matsil, LLP (57) ABSTRACT

An embodiment vertiport includes a main body portion having a lower space, a take-off and landing zone disposed in the lower space and spaced apart from the main body portion by a predetermined gap, a door portion disposed in the gap and configured to open or close the gap, a plurality of elevating portions disposed to surround the take-off and landing zone in the lower space, a ring-shaped portion surrounding the take-off and landing zone and connected to the plurality of elevating portions, wherein the ring-shaped portion is configured to be elevated by the plurality of elevating portions, and a plurality of generators disposed on the ring-shaped portion in a fixed position.

20 Claims, 5 Drawing Sheets

(56) References Cited

U.S. PATENT DOCUMENTS

| | | | |
|---|---|---|---|
| 2009/0250936 A1* | 10/2009 | Souryal | F03D 9/255 |
| | | | 290/55 |
| 2010/0276940 A1* | 11/2010 | Khavari | F03D 9/43 |
| | | | 290/55 |
| 2011/0174925 A1 | 7/2011 | Ying | |
| 2016/0052531 A1* | 2/2016 | Boukari | B61L 23/04 |
| | | | 348/148 |
| 2018/0226860 A1* | 8/2018 | Glatfelter | H02K 7/1823 |
| 2019/0225249 A1* | 7/2019 | Boukari | B61K 9/08 |
| 2019/0280563 A1* | 9/2019 | Glatfelter | F03D 9/43 |
| 2023/0271721 A1 | 8/2023 | Sauer | |

FOREIGN PATENT DOCUMENTS

| | | | |
|---|---|---|---|
| JP | 2023028989 A | * | 3/2023 |
| KR | 20200011402 A | | 2/2020 |
| KR | 20200043980 A | | 4/2020 |
| KR | 20210143448 A | * | 11/2021 |
| KR | 20220074826 A | | 6/2022 |
| KR | 102490173 B1 | | 1/2023 |
| WO | 2019005937 A1 | | 1/2019 |
| WO | 2020243364 A2 | | 12/2020 |

* cited by examiner

VERTIPORT HAVING WIND GENERATOR, AND METHOD FOR LANDING AIRCRAFT USING THE SAME

CROSS-REFERENCE TO RELATED APPLICATIONS

This application claims the benefit of Korean Patent Application No. 10-2023-0192626, filed on Dec. 27, 2023, which application is hereby incorporated herein by reference in its entirety.

TECHNICAL FIELD

The present disclosure relates to a vertiport having a wind generator and a method for landing an aircraft using the same.

BACKGROUND

With the development of the urban air mobility vehicle (hereinafter, referred to as a UAM vehicle), a take-off and landing area where a UAM vehicle may take-off and land within an urban area is required. The take-off and landing area is being considered to be installed on the rooftop of a high-rise building or in a park within the urban area. Because of this, the take-off and landing area inevitably occupies a much smaller area than an airport with a typical runway.

Meanwhile, the take-off and landing area is provided with infrastructure and a support system for landing, ground handling, take-off, and the like of UAM vehicles. To this end, electricity for lighting and support systems or electricity for charging an electric-powered UAM is required, and there may be no alternative to covering electricity demand other than with commercially available electricity.

SUMMARY

The present disclosure relates to a vertiport having a wind generator and a method for landing an aircraft using the same. Particular embodiments relate to a vertiport having a wind turbine generator that can produce electricity using wind generated during take-off and landing of an aircraft and a method for landing an aircraft using the same.

An embodiment of the present disclosure provides a vertiport having a wind turbine generator capable of producing electricity using wind generated during take-off and landing of an aircraft and a method for landing an aircraft using the same.

According to an embodiment of the present disclosure, a vertiport may include a main body portion having a lower space, a take-off and landing zone disposed in the lower space and spaced apart from the main body portion by a predetermined gap, a door portion disposed in the gap to open or close the gap, a plurality of elevating portions disposed to surround the take-off and landing zone in the lower space, a ring-shaped portion surrounding the take-off and landing zone and which is elevated through being connected to the plurality of elevating portions, and a plurality of generators disposed on the ring-shaped portion, wherein the plurality of generators may have a fixed position on the ring-shaped portion.

The vertiport may be converted into a basic mode, in which the door portion is closed, and the ring-shaped portion and the plurality of generators are lowered by the elevating portion and are located in the lower space, and a power generation mode in which the door portion is opened, and the ring-shaped portion and the plurality of generators are raised by the elevating portion, so that the plurality of generators are exposed externally within the gap.

The take-off and landing zone may include a marking portion providing a reference position and reference direction so that an aircraft lands with a constant position and direction.

The marking portion may indicate magnetic north.

The marking portion may include a beacon transmitting non-directional radio waves.

The elevating portion may include a plurality of rails installed upright in the lower space of the main body portion and having a rack gear formed on one side thereof, a support bracket formed on one side thereof, so that the rail penetrates therethrough, a first driving unit fixedly installed to the support bracket, and a first pinion gear connected to the first driving unit and engaged with the rack gear.

The ring-shaped portion may further include a rotating portion moving the plurality of generators in a circumferential direction.

The rotating portion may include an external ring gear formed on a lateral peripheral surface of the ring-shaped portion in a circumferential direction, a second driving unit fixedly installed on the support bracket, and a second pinion gear connected to the second driving unit and engaged with the external ring gear.

The support bracket may be provided with a connection portion having a rolling member to connect the ring-shaped portion, the ring-shaped portion may be provided with a connection groove formed in the circumferential direction of the ring-shaped portion, and the rolling member may travel within the connection groove.

The vertiport may further include a control unit electrically connected to at least the door portion and the elevating portion and controlling opening and closing of the door portion and raising and lowering of the ring-shaped portion by the elevating portion.

The ring-shaped portion may further include a rotating portion moving the plurality of generators in a circumferential direction, wherein the control unit may be electrically connected to the rotating portion to drive the rotating portion and rotate the ring-shaped portion based on model information and state information of an aircraft, thereby changing the positions of the plurality of generators by a predetermined angle.

The plurality of generators may include a wind turbine generator producing electricity using wind generated during the landing of an aircraft in the take-off and landing zone.

According to an embodiment of the present disclosure, a method for landing an aircraft may include operations in which an aircraft approaches a vertiport, it is determined whether the aircraft is a model of aircraft capable of generating power, a door portion of the vertiport is opened and a ring-shaped portion and a plurality of generators thereof are raised when it is determined that that aircraft is a model of aircraft capable of generating power, electricity is produced using the plurality of generators as the aircraft is lowered, the aircraft lands on a take-off and landing zone of the vertiport and is parked, and the ring-shaped portion and the plurality of generators are lowered and the door portion is closed.

In the determining whether the aircraft is a model of aircraft capable of generating power, by receiving coordinates regarding disposition of each rotor from a center of the aircraft, a control unit may determine whether the aircraft is a model of aircraft capable of generating power.

The method for landing an aircraft may further include rotating the ring-shaped portion and moving the plurality of generators to an operating position that can increase power generation efficiency, based on model information and state information of an aircraft.

In the producing electricity, the plurality of generators may produce electricity using wind generated when the aircraft is lowered.

BRIEF DESCRIPTION OF THE DRAWINGS

The above and other aspects, features, and advantages of embodiments of the present disclosure will be more clearly understood from the following detailed description, taken in conjunction with the accompanying drawings, in which.

DETAILED DESCRIPTION OF ILLUSTRATIVE EMBODIMENTS

Hereinafter, embodiments of the present disclosure will be described in detail with reference to exemplary drawings. In adding reference numerals to components of each drawing, it should be noted that the same components are indicated by the same numerals even though displayed on different drawings.

The vertiport according to embodiments of the present disclosure may refer to a ground structure for vertical take-off and landing, charging, maintenance, and the like of an aircraft, and the vertiport may be understood to include a vertihub, a vertiport, a vertistop, and the like classified according to size.

Here, a vertihub is the largest take-off and landing area, enabling large-scale transfer of surrounding transportation, and has support infrastructure such as charging and maintenance infrastructure, so it may accommodate multiple UAM vehicles after their operations have ended. A vertiport is a smaller take-off and landing area than a vertihub, has support infrastructure such as charging and maintenance infrastructure, and may provide convenience facilities for passengers. A vertistop or vertistation is smaller than a vertiport and may refer to a small-scale take-off and landing area with one or two aprons.

In this specification, for convenience of explanation, an example of a take-off and landing area such as a vertihub, vertiport, vertistop and the like will be described, but the embodiments of the present disclosure are not necessarily limited thereto.

In addition, embodiments of the present disclosure may be applied to an aircraft, such as a UAM vehicle, for example. The aircraft may be used to transport individuals or a plurality of passengers within or between urban areas. In addition, the aircraft can also be used for cargo delivery, such as courier services.

In the present specification, an aircraft may refer to a vehicle configured to fly and move through the air. In other words, the aircraft may refer to a drone, a tilt rotor aircraft, a vertical take-off and landing aircraft, a rotary-wing aircraft, and the like, and it may also include a vehicle that may land on the ground, a structure, or the like, using a landing device, after the flight.

In addition, the aircraft may include a manned aircraft and an unmanned aircraft. The manned aircraft may include a vehicle that may operate in autonomous flight in addition to an aircraft operated by a pilot.

For convenience of explanation, embodiments of the present disclosure are explained and illustrated as an example of application to a tilt-rotor aircraft or vertical take-off and landing aircraft capable of vertical take-off from and landing in a narrow take-off and landing area. However, application examples of embodiments of the present disclosure are not necessarily limited thereto.

Figure 1:
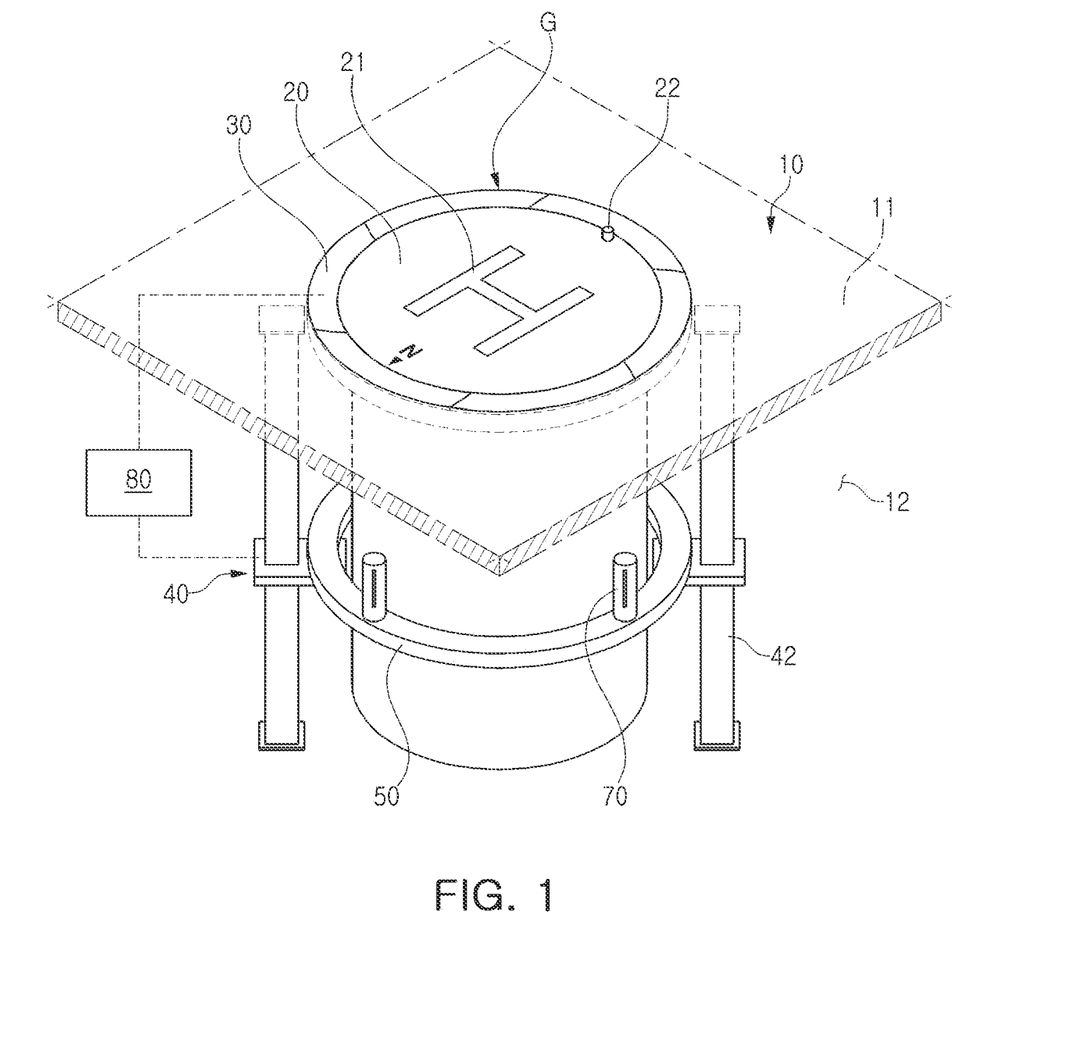
FIG. 1 is a perspective view illustrating a vertiport according to embodiments of the present disclosure.
Figure 2:
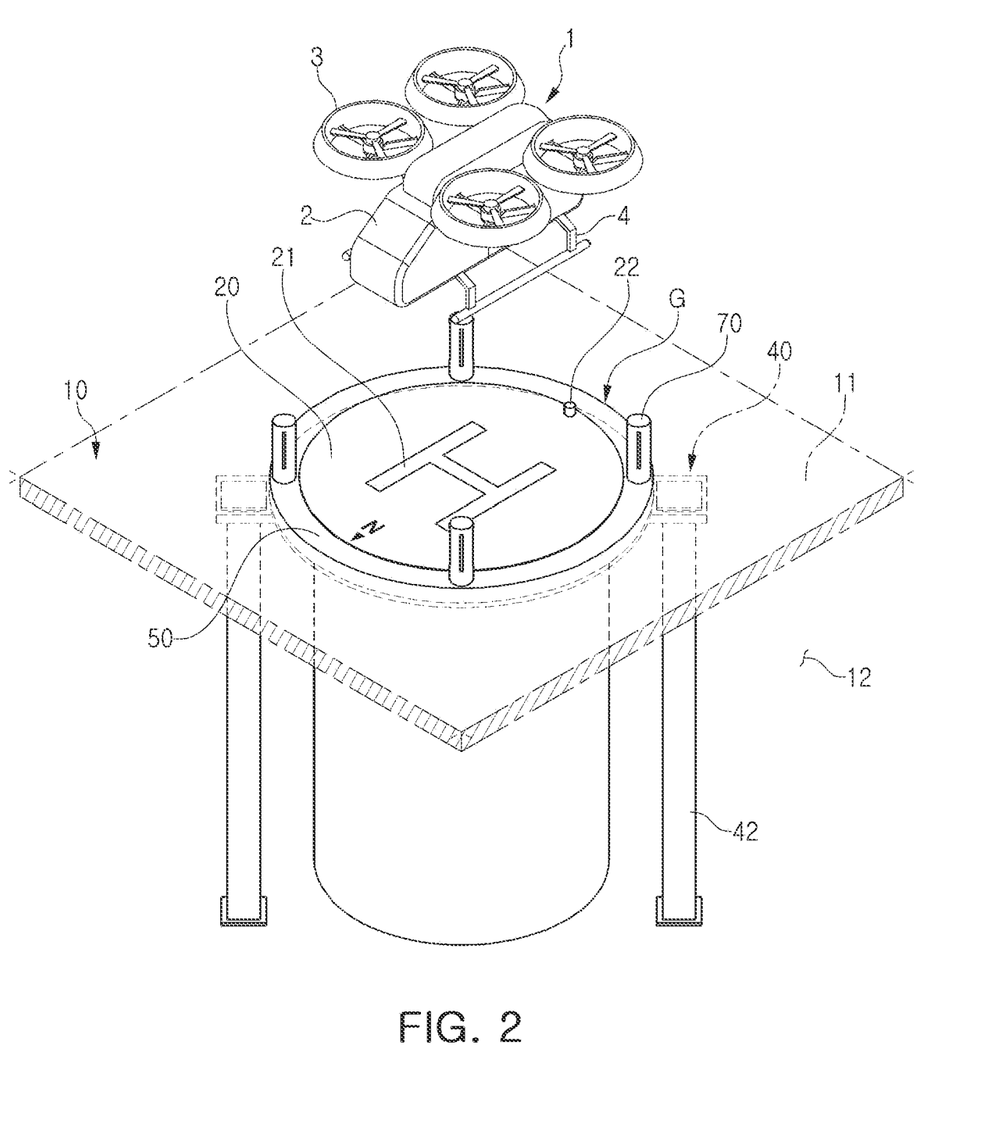
FIG. 2 is a perspective view illustrating a state in which a generator is raised in a vertiport.
Figure 3:
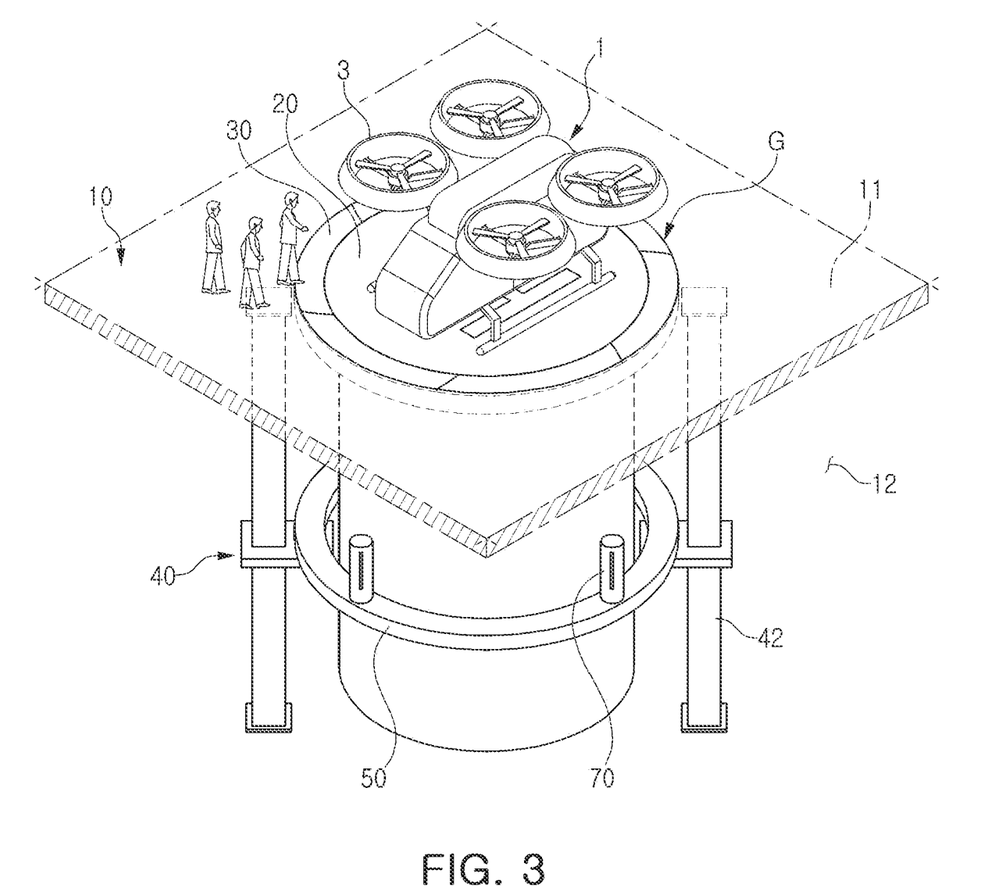
FIG. 3 is a perspective view illustrating a state in which an aircraft lands on a vertiport.

FIG. 1 is a perspective view illustrating a vertiport according to embodiments of the present disclosure, and FIG. 2 is a perspective view illustrating a state in which a generator is raised in a vertiport. FIG. 3 is a perspective view illustrating a state in which an aircraft lands on a vertiport.

The vertiport according to embodiments of the present disclosure may include a main body portion 10, a take-off and landing zone 20, a door portion 30, a plurality of elevating portions 40, a ring-shaped portion 50, and a plurality of generators 70.

The main body portion 10 may be configured to allow an aircraft 1 to take-off and land, stop for a certain period of time, or move. Other components of the vertiport may be disposed inside and/or outside the main body portion.

For example, the take-off and landing zone 20 and the door portion 30 may be disposed to be exposed externally within the main body portion 10, and the elevating portion 40, the ring-shaped portion 50, and the like may be disposed inside the main body portion 10. In addition, the generator 70 may be disposed to be able to reciprocate inside and outside of the main body portion.

The main body portion 10 may be provided to support the opening and closing operation of the door portion 30 and the raising and lowering operation of the elevating portion 40. For example, the door portion may be coupled to at least a portion of the main body portion and may be opened or closed. In addition, an elevating portion may be installed on at least a portion of the main body portion so that the ring-shaped portion 50 may be raised or lowered.

As described above, the main body portion 10 may be comprised of a structure on which other components of the vertiport may be disposed and/or installed. To this end, the main body portion may include a flat surface 11 comprising a floor or platform and a lower space 12 located below the flat surface 11.

In addition, although not shown in the drawings, the main body portion 10 may be provided with equipment or auxiliary facilities for take-off, landing, stopping, charging, maintenance, movement, and the like of the aircraft 1.

The take-off and landing zone 20 is a zone on which the aircraft 1 takes-off or lands and the aircraft is parked, and it may be formed in at least a portion of the main body portion 10. The take-off and landing zone 20 may include an upper surface parallel with the flat surface 11 of the main body portion 10.

The take-off and landing zone 20 may be disposed in the lower space 12 of the main body portion 10 to be spaced apart from the main body portion 10. As a result, a gap G may be formed between the take-off and landing zone 20 and the main body portion 10.

The gap G between the take-off and landing zone 20 and the main body portion 10 may provide a space in which the door portion 30 is disposed, and when the door portion is opened, the ring-shaped portion 50 may be raised to provide a space in which a plurality of generators 70 are exposed externally.

For example, the take-off and landing zone 20 may be formed in the form of a pillar with a cross-sectional shape such as circular, oval, or polygonal, but embodiments of the present disclosure are not necessarily limited thereto. Additionally, according to the examples shown and described, the take-off and landing zone 20 may be formed separately from the main body portion 10, but embodiments of the present disclosure are not necessarily limited thereto.

As another example, the take-off and landing zone 20 may be formed integrally with the main body portion 10 and may also be provided as a portion of the main body portion 10. In other words, the main body portion 10 may include a main section and a take-off and landing section, and the gap G may be formed between the main section and the take-off and landing section. In this case, the take-off and landing section may form a take-off and landing zone.

The take-off and landing zone 20 may be provided with a marking portion 21 providing a reference position and reference direction so that the aircraft 1 lands with a constant position and direction. As illustrated in FIGS. 1 to 3, characters such as the alphabet or patterns such as arrows drawn on the upper surface of the take-off and landing zone 20 may be used as the marking portion 21. Preferably, the marking portion 21 may indicate magnetic north (N).

In this case, the aircraft 1 may measure its own position by receiving a global positioning system (GPS) signal from a satellite or sensing by an inertial navigation system (INS). A pilot may operate the aircraft based on the measured position information so that the aircraft reaches the reference position of the marking portion 21 in the sky above the take-off and landing zone 20.

Subsequently, the pilot may identify the reference direction of the marking portion 21 with the naked eye in the sky above the take-off and landing zone 20, or the pilot may turn the aircraft 1 based on azimuth information provided by a geomagnetic sensor in the aircraft 1, or the like, so that a head direction of the aircraft 1 may be made consistent with the reference direction of the marking portion 21.

Alternatively, a beacon 22 transmitting constant non-directional radio waves may be employed as the marking portion 21. In this case, the pilot may turn the aircraft 1 based on relative direction information provided by a receiver, an automatic direction finder (ADF), or the like, receiving the radio waves in the sky above the take-off and landing zone 20, so that a head direction of the aircraft 1 may be made consistent with the reference direction of the marking portion 21.

The door portion 30 may be installed to enable opening and closing operations between the take-off and landing zone 20 and the main body portion 10. Specifically, the door portion 30 may be disposed in the gap G between the take-off and landing zone 20 and the main body portion 10 to open or close the gap G.

For example, an electric door to which a motor is applied along with an iris mechanism may be used as the door portion 30, but embodiments of the present disclosure are not necessarily limited thereto. Since iris mechanisms with various configurations are already known, detailed descriptions thereof will be omitted in this specification.

When the door portion 30 is closed, the gap G between the take-off and landing zone 20 and the main body portion 10 may be closed and covered by the door portion 30. In this case, the door portion 30 may act as a walkway connecting the take-off and landing zone 20 and the main body 10 so that passengers may safely and easily cross the gap G.

When the door portion 30 is opened, the gap G between the take-off and landing zone 20 and the main body portion 10 is exposed externally, and a passage which allows the plurality of generators 70 to reciprocate may be formed.

Meanwhile, as illustrated in FIGS. 2 and 3, the aircraft 1 may include a fuselage 2 provided with a boarding space and a boarding gate and a plurality of rotors 3 provided in the fuselage.

At least a portion of the plurality of rotors 3 may be configured as tilting rotors capable of tilting upwardly or downwardly for lifting or cruising the fuselage 2. At least two of these rotors 3 may be disposed on the left and right sides of the fuselage, respectively, based on the center of the fuselage, but the position and number of rotors are not necessarily limited thereto. For example, a helicopter may have a single rotor 3 disposed on the fuselage 2.

Passengers may board the fuselage 2, and the fuselage 2 is capable of vertical take-off and landing and horizontal cruising. Additionally, a landing gear 5 may be installed on the bottom of the fuselage 2 to support or allow movement of the fuselage 2 on the ground or in a vertiport. The disposition and the number of landing gear members are not limited to the examples shown.

The aircraft 1 shown in FIGS. 2 and 3 is illustrative, and the shape of the aircraft which takes-off from and lands on the vertiport according to embodiments of the present disclosure is not particularly limited, and various types of aircrafts capable of vertical take-off and landing may take-off from and land on the vertiport.

Figure 4:
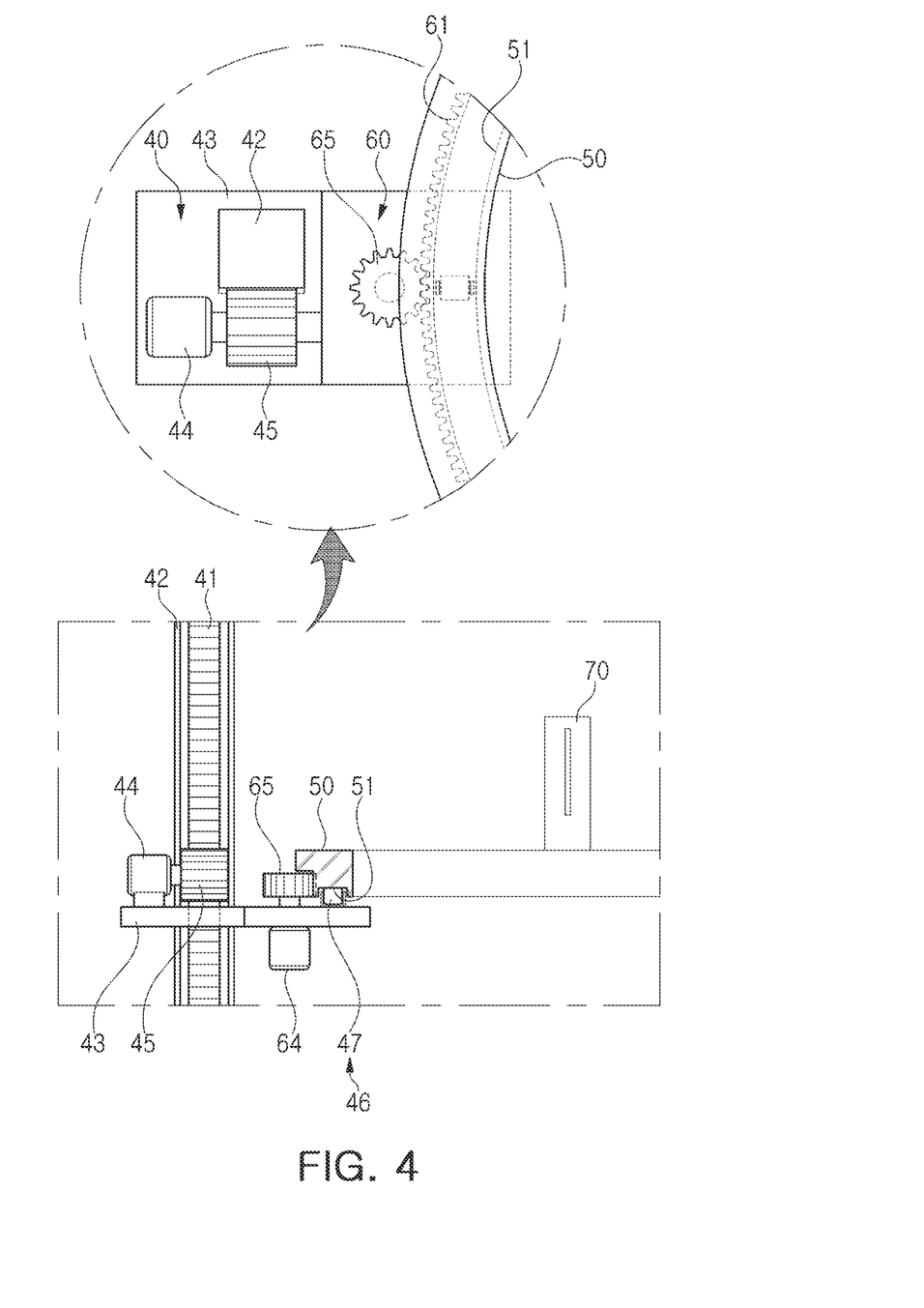
FIG. 4 is an enlarged view illustrating the configuration and disposition of an elevating portion, a ring-shaped portion, and a rotating portion.

FIG. 4 is an enlarged view illustrating the configuration and disposition of an elevating portion, a ring-shaped portion, and a rotating portion.

A plurality of elevating portions 40 may be disposed to surround the take-off and landing zone 20 in the lower space 12 of the main body portion 10. The elevating portion 40 supports the ring-shaped portion 50 and allows the ring-shaped portion 50 to be raised and lowered. To this end, the elevating portion 40 may include, for example, a rack and pinion mechanism, but embodiments of the present disclosure are not necessarily limited thereto.

Specifically, the elevating portion 40 may include a plurality of rails 42 installed upright around the take-off and landing zone 20 in the lower space 12 of the main body portion 10 and having a rack gear 41 formed on one side, a support bracket 43 formed on one side thereof so that the rail 42 penetrates therethrough, a first driving unit 44 fixedly installed on the support bracket 43, and a first pinion gear 45 connected to the first driving unit 44 and engaged with the rack gear 41.

At least two or more rails 42 may be disposed to be parallel to each other with the take-off and landing zone 20 interposed therebetween. The rack gear 41 may be formed on one side of each rail 42 in a longitudinal direction of the rail 42.

A through-hole is formed in the support bracket 43, and the rail 42 may be inserted into the through-hole to penetrate through the support bracket 43. Optionally, the through-hole may be provided with a grommet allowing the rail 42 to pass through and move smoothly relative to the support bracket 43.

In addition, the first driving unit 44 may be fixedly installed on the support bracket 43 by, for example, bolting or adhesion. The first driving unit 44 may include a motor capable of forward and reverse rotation and the first pinion gear 45 may be directly connected to the motor shaft. When the first driving unit 44 has a reducer, the first pinion gear 45 may be connected to the motor shaft via the reducer.

In addition, the support bracket 43 may be provided with a connection portion 46 for connecting the ring-shaped portion 50. For example, the connection portion 46 may be formed as a protrusion, and a connection groove 51 may be formed on a bottom surface of the ring-shaped portion 50. The protrusion of the connection portion 46 may be locked or shape-fitted into the connection groove 51, so that the support bracket 53 and the ring-shaped portion 50 may be connected.

However, the configuration of the elevating portion 40 is not limited to the above-described example, and instead of the rack and pinion mechanism, for example, a mechanism including a sprocket and chain, or a mechanism including a pulley and a belt, and the like may be adopted.

The elevating portion 40 configured in this manner may elevate the ring-shaped portion 50 in the vertical direction, and the ring-shaped portion 50 may support a plurality of generators 70, so that the generators 70 may be raised or lowered by the elevating portion 40 together with the ring-shaped portion 50.

The ring-shaped portion 50 may be formed in a ring shape such as a circle, oval, or polygon. In the drawings, it is shown as a circular ring, but embodiments of the present disclosure are not necessarily limited thereto.

For example, the ring-shaped portion 50 may be formed in a ring shape corresponding to the shape of the gap G so that the ring-shaped portion 50 may be located in the gap G between the take-off and landing zone 20 and the main body portion 10. The bottom surface of the ring-shaped portion 50 may be supported by the support bracket 43 on each of the plurality of elevating portions 40, and the ring-shaped portion 50 may support the plurality of generators 70 at intervals from each other in a circumferential direction on the upper surface so that the positions of the generators 70 are fixed.

The ring-shaped portion 50 may be raised along the elevating portion 40 to expose the plurality of generators 70 onto the main body portion 10, so that the vertiport may be converted from a basic mode to a power generation mode. Conversely, the ring-shaped portion 50 may be lowered along the elevating portion 40 to locate the plurality of generators 70 in the lower space 12 of the main body portion 10 and to close the door portion 30, so that the vertiport may be converted from a power generation mode to a basic mode.

In the power generation mode, as the door portion 30 is opened, the ring-shaped portion 50 and the generators 70 may be raised and may be located in the gap G between the take-off and landing zone 20 and the main body portion 10. In the basic mode, the ring-shaped portion 50 and the generators 70 may be lowered and accommodated in the gap G and located in the lower space 12 of the main body portion 10 and then the door portion 30 may be closed. Here, the opening and closing operation of the door portion 30 and the raising and lowering operation of the elevating portion 40 may be controlled by a control unit 80, which will be described later.

Optionally, the ring-shaped portion 50 may support the plurality of generators 70 to move in a circumferential direction on the upper surface, thereby supporting the plurality of generators 70 so that the positions of the generators 70 vary at a predetermined angle. To this end, the ring-shaped portion 50 may further include a rotating portion 60 having, for example, a ring gear and a pinion gear.

Specifically, the rotating portion 60 may include an external ring gear 61 formed in a circumferential direction on a lateral peripheral surface of the ring-shaped portion 50, a second driving unit 64 fixedly installed on the support bracket 43 of the elevating portion 40, and a second pinion gear 65 connected to the second driving unit 64 and engaged with the external ring gear 61.

The second driving unit 64 may be fixedly installed on the support bracket 43 by, for example, bolting or adhesion. The second driving unit 64 may include a motor capable of forward and reverse rotation, and the second pinion gear 65 may be directly connected to a motor shaft. When the second driving unit 64 has a reducer, the second pinion gear 65 may be connected to the motor shaft via the reducer.

In this case, the connection portion 46 mounted on the support bracket 43 may have a rolling member 47 such as a roller, a ball, or the like, and the connection groove 51 may be formed in a circumferential direction of the ring-shaped portion 50 on a bottom surface of the ring-shaped portion 50.

The connection groove 51 may act as a travelling path guiding the rolling member 47 of the connection portion 46 and may simultaneously accommodate the rolling member 47 to hold and support the same. As a result, the connection groove 51 may allow the support bracket 43 and the ring-shaped portion 50 to be connected and moved, and it may prevent the ring-shaped portion 50 from being separated from the support bracket 43.

However, the configuration of the rotating portion 60 is not limited to the above-described examples, and instead of the ring gear and pinion gear, for example, a mechanism including a sprocket and a chain, a mechanism including a pulley and a belt, or the like may be adopted.

The rotating portion 60 configured in this manner may allow the ring-shaped portion 50 to move in the circumferential direction to vary the positions of the plurality of generators 70 according to the direction of the aircraft 1. Here, since the plurality of generators 70 have a fixed position and are supported on the upper surface of the ring-shaped portion 50, electricity may be generated by at least a portion of the generators 70 for the corresponding rotors 3 of the aircraft 1 in which the number and position of the rotors 3 are specified.

The plurality of generators 70 may generate electricity using wind power of a vortex generated during take-off and landing of the aircraft 1. For example, the generator 70 may convert kinetic energy of wind caused by a vortex into mechanical energy and produce electricity using the converted mechanical energy. The generator 70 may include a wind turbine or a wind turbine generator.

The electricity produced through the generator 70 may be supplied to demand sources (for example, lighting or system power) provided in the vertiport or may be used to charge the aircraft 1 parked at the vertiport. However, the utilization of electricity is not limited to the examples described above.

When the ring-shaped portion 50 further includes the rotating portion 60, the plurality of generators 70 may be moved to an operating position that can increase electricity generation efficiency based on model information and state information of the aircraft 1 landing on the take-off and landing zone 20 of the vertiport. Here, the operating position that can increase power generation efficiency can be calculated and determined by the control unit 80.

The control unit 80 may control the overall operation and driving of the vertiport. The control unit 80 may be provided in the main body portion 10. The control unit 80 may control the opening and closing of the door portion 30, the raising and lowering of the ring-shaped portion 50 by the elevating portion 40, the movement of the ring-shaped portion 50 by the rotating portion 60, and the like. To this end, the control unit 80 may be electrically connected to the motor of the door portion 30, the first driving unit 44 of the elevating portion 40, and the second driving unit 64 of the rotating portion 60.

The control unit 80 may transmit or receive various information and/or signals related to the take-off and landing of the aircraft to or from the aircraft 1 and/or a control server (not shown). The control unit 80 includes a communication module, and the communication module may be connected to at least one communication network among, for example, a wired, wireless, or wired/wireless communication network.

For example, the control unit 80 may receive information about the aircraft 1 which is about to land on a vertiport from the aircraft 1 and/or a control server. In particular, by receiving coordinates regarding the disposition of each rotor 3 from a center of the aircraft 1, the control unit 80 may determine whether the aircraft 1 is a model of aircraft capable of generating power using wind power.

If the aircraft 1 is determined to be capable of generating power using wind power, the control unit 80 may control the door portion 30 and the elevating portion 40 to open the door portion 30 and operate the elevating portion 40 to raise the ring-shaped portion 50 and the plurality of generators 70. In addition, when preparations for landing are completed, the control unit 80 may transmit a landing permission signal to the aircraft 1 and/or the control server.

In addition, when a landing completion signal is received from the aircraft 1, the control unit 80 may control the door portion 30 and the elevating portion 40 to close the door portion 30 and operate the elevating portion 40 to lower the ring-shaped portion 50 and the plurality of generators 70. In addition, when the door portion 30 is completely closed, the control unit 80 may transmit a signal for permission for passengers to disembark and/or for cargo to be unloaded to the aircraft 1 and/or the control server.

The above-described information and/or signal transmission is illustrative, and in addition to the above-described information, the control unit 80 may transmit and receive additional information and/or signals required in relation to take-off and landing of the aircraft 1 with the aircraft 1 and/or the control server.

The control unit 80 may include a processor and memory. The processor may process the overall operation of the control unit 80, and the memory may store programs for the operation of the control unit 80, input/output data, various setting information, and the like.

For example, the memory of the control unit 80 may store model information (in particular, the position of the rotor 3 for each model) about various types of aircraft 1 which take-off from and land on a vertiport. In addition, a logic for calculating an operating position at which the generator 70 has maximum power generation efficiency in response to the model information and state information of the aircraft 1 may be stored in the memory of the control unit 80.

When the ring-shaped portion 50 further includes the rotating portion 60, for example, if the aircraft 1 deviates from a reference direction and intends to land, the rotating portion 60 is operated under the control of the control unit 80 based on azimuth information provided from a geomagnetic sensor in the aircraft 1, so that the plurality of generators 70 may be moved to an operating position that can increase electricity generation efficiency.

As described above, when the ring-shaped portion 50 further includes the rotating portion 60, based on the model information and state information of the aircraft 1 to be landed, the positions of the generators 70 in the vertiport may be adjusted to vary at a predetermined angle in order to increase the power generation efficiency of the generators 70.

The model information of the aircraft 1 is mainly related to the type of aircraft and may include location information of the rotor 3 for each type. In addition, the state information of the aircraft 1 relates to a state in which the aircraft 1 is landing and may include the position and direction in which the aircraft 1 is landing. The state information of the aircraft 1 may be detected or calculated through the deviation in the relative position and direction of the aircraft 1 with respect to the reference position and reference direction set by the marking portion 21 of the take-off and landing zone 20.

Accordingly, the control unit 80 may calculate the operating position of the generator 70 that can obtain maximum efficiency by comprehensively considering the position and direction in which the aircraft intends to land on the take-off and landing zone 20 along with the position of the rotor 3 in the aircraft 1 and move each of the generators 70 to a desired operating position by driving the rotating portion 60 to rotate the ring-shaped portion 50.

If the ring-shaped portion 50 does not have the rotating portion 60, the marking portion 21 indicating magnetic north N is provided as described above, and it is assumed that the aircraft 1 lands on the take-off and landing zone 20 to be consistent with the reference position and reference direction, so that each of the plurality of generators 70 may be disposed to be set at a position corresponding to the rotor 3 in a specific model of aircraft. In this case, the generators 70 may only be raised and lowered without the movement.

Figure 5:
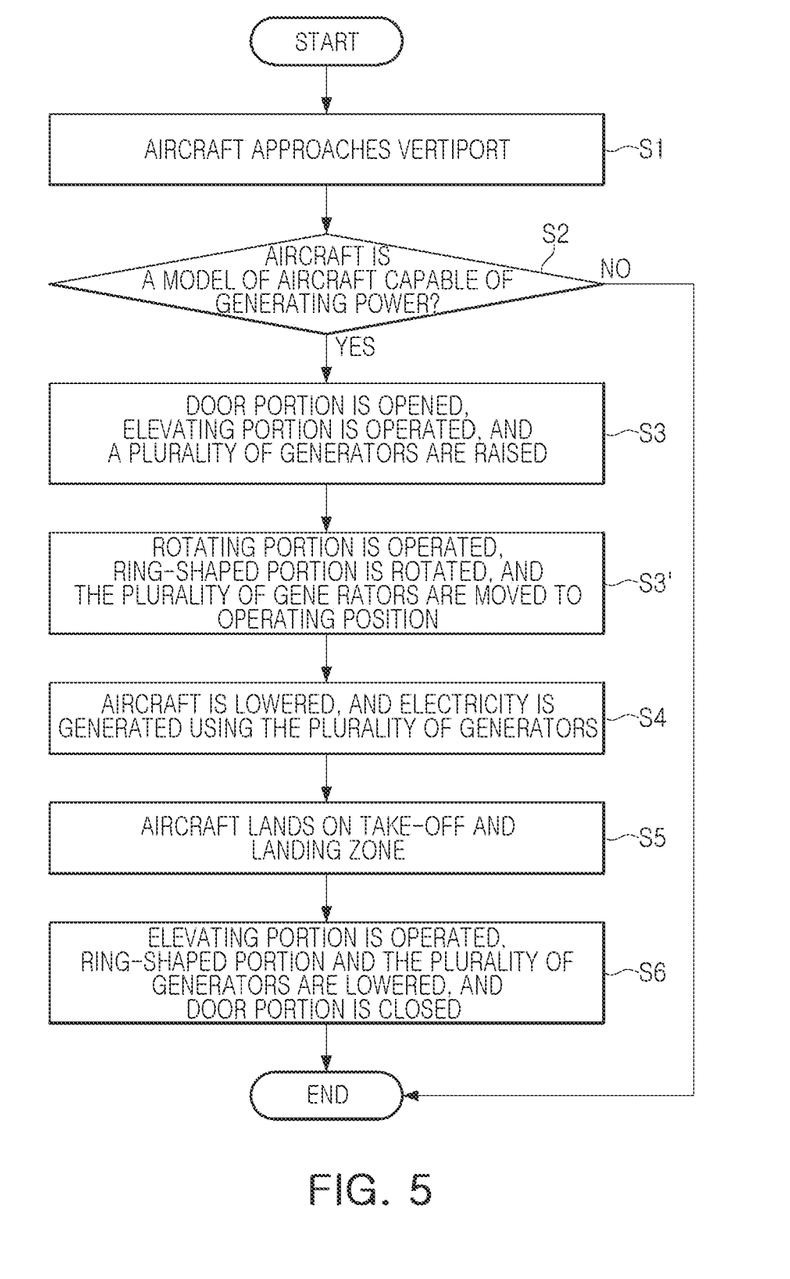
FIG. 5 is a flowchart illustrating a method for landing an aircraft according to embodiments of the present disclosure.

FIG. 5 is a flowchart illustrating a method for landing an aircraft according to embodiments of the present disclosure.

The method for landing an aircraft 1 on a vertiport may include operations in which: an aircraft approaches a vertiport (S1); it is determined whether the aircraft is a model of aircraft capable of generating power using wind power (S2); a door portion of the vertiport is opened, an elevating portion is operated, and a plurality of generators thereof are raised, when it is determined that the aircraft is a model of aircraft capable of generating power using wind power (S3); electricity is generated using the plurality of generators as the aircraft is lowered (S4); the aircraft lands on a take-off and landing zone of the vertiport and is parked (S5); and the elevating portion is operated, the ring-shaped portion and the plurality of generators are lowered, and the door portion is closed (S6).

The aircraft 1 may approach a vertiport to land on the vertiport (S1). In this case, the vertiport may be placed in the basic mode shown in FIG. 1.

The aircraft 1 may transmit the model information and state information of the aircraft to the control unit 80 of the vertiport via a control server. In particular, by receiving coordinates regarding the disposition of each rotor 3 from a center of the aircraft 1, the control unit 80 may determine whether the aircraft 1 is a model of aircraft capable of generating power using wind power (S2).

When it is determined that the aircraft 1 is a model of aircraft capable of generating power using wind power, the control unit 80 may control the door portion 30 and the elevating portion 40 to open the door portion 30 and operate the elevating portion 40 to raise the ring-shaped portion 50 and the plurality of generators 70.

As the door portion 30 is opened and the ring-shaped portion 50 is raised by the elevating portion 40, the plurality of generators 70 may move externally through the gap G between the take-off and landing zone 20 and the main body portion 10 and be exposed (S3).

Thereby, the vertiport may be converted into a state of a power generation mode shown in FIG. 2. In this case, the aircraft 1 may hover above the take-off and landing zone 20, and the plurality of generators 70 may be optionally moved to an operating position that can increase power generation efficiency by the rotating portion 60.

Optionally, when the ring-shaped portion 50 further includes the rotating portion 60, the control unit 80 may calculate an operating position of the generator 70 based on model information and state information of the aircraft 1, and the rotating portion 60 may operate under the control of the control unit 80 and the plurality of generators 70 may be moved to an operating position that can increase power generation efficiency (S3').

Here, the operating position refers to a position of the generator 70 that can produce electricity with maximum efficiency in response to the direction in which the aircraft 1 is landing and the position of the rotor 3.

For example, the control unit 80 may calculate deviation in a relative position and direction of the aircraft 1 with respect to the reference position and reference direction set in the take-off and landing zone 20, and the operating position of the generator 70 that can produce electricity with maximum efficiency in response to the relative position of rotor 3 according to the calculated deviation in the direction may be determined.

When preparations for landing are completed, that is, when the vertiport is converted to be in a power generation mode, the control unit 80 may transmit a landing permission signal to the aircraft 1 and/or the control server.

Subsequently, the aircraft 1 may be lowered toward the take-off and landing zone 20 for landing. The plurality of generators 70 may produce electricity by generating power using a vortex generated as the aircraft is lowered (S4). Electricity produced by the plurality of generators may be supplied to demand sources provided on the vertiport.

When the aircraft 1 is parked on the take-off and landing zone 20 and landing is completed (S5), the aircraft may transmit a landing completion signal to the control unit 80 via the control server, and after receiving a landing completion signal from the aircraft 1, the control unit 80 may operate the elevating portion 40 to lower the ring-shaped portion 50 and the plurality of generators 70 and prepare for closing the door portion 30.

After the ring-shaped portion 50 and the plurality of generators 70 are completely lowered, the door portion 30 may be closed (S6). When the door portion 30 is completely closed, the control unit 80 may transmit a signal for permission to load and/or unload passengers and/or cargo to the aircraft 1 and/or the control server.

Meanwhile, the aircraft 1 may communicate with a control server generally controlling the aircraft's route and take-off and landing, and the control unit 80 of the vertiport may transmit and receive various information signals related to take-off and landing of the aircraft 1 to and from the aircraft 1 via the control server. According to various embodiments, the control server may include the control unit 80 of the vertiport.

In addition, optionally, when the aircraft 1 waits for a long time at the vertiport before take-off, the door portion 30 may be opened and the plurality of generators 70 may be raised, so that power may be generated using a vortex generated when the aircraft waits for take-off while the rotor 3 rotates. In this case, the method for taking off the aircraft from the vertiport according to embodiments of the present disclosure may be roughly implemented in the reverse order of the above-described example.

As described above, according to the embodiments of the present disclosure, downdraft energy generated during the landing and take-off of an aircraft may be converted into electrical energy and may be utilized, so that energy efficiency may be increased and at least a certain level of energy independence at the vertiport may be secured, and an eco-friendly vertiport may be built.

As set forth above, according to an embodiment of the present disclosure, by converting wind energy generated during a landing process of an aircraft into electrical energy and utilizing the same, in addition to increasing energy efficiency and securing at least a certain level of energy independence in the take-off and landing area, it is possible to build an eco-friendly take-off and landing area.

The aforementioned description merely illustrates the technical concept of the present disclosure, and a person skilled in the art to which the present invention pertains may make various modifications without departing from the essential characteristics of the embodiments of the present disclosure.

Therefore, the example embodiments disclosed in this specification and drawings are not intended to limit but to explain the technical concept of the present disclosure, and the scope of the technical idea of the present disclosure is not limited by these example embodiments. The scope of protection of the present disclosure should be interpreted by the following claims, and all technical ideas within the scope equivalent thereto should be interpreted as being included in the scope of the present disclosure.

What is claimed is:

1. A vertiport comprising:
   a main body portion having a lower space and a flat surface;
   a take-off and landing zone disposed in the lower space and spaced apart from the main body portion by a predetermined gap, wherein the take-off and landing zone comprises an upper surface parallel with the flat surface of the main body portion;
   a door portion disposed in the gap and configured to open or close the gap;
   a plurality of elevating portions disposed to surround the take-off and landing zone in the lower space;
   a ring-shaped portion surrounding the take-off and landing zone and connected to the plurality of elevating portions, wherein the ring-shaped portion is configured to be elevated by the plurality of elevating portions; and
   a plurality of generators disposed on the ring-shaped portion in a fixed position.

2. The vertiport of claim 1, wherein:
   the vertiport is configured to switch between a basic mode and a power generation mode;
   in the basic mode, the door portion is in a closed state and the ring-shaped portion and the plurality of generators are in a lowered state and are situated in the lower space; and
   in the power generation mode, the door portion is in an open state, the ring-shaped portion and the plurality of generators are in a raised state, and the plurality of generators are exposed externally within the gap.

3. The vertiport of claim 1, wherein the take-off and landing zone comprises a marking portion configured to provide a reference position and a reference direction to enable an aircraft to land with a constant position and a constant direction.

4. The vertiport of claim 3, wherein the marking portion indicates magnetic north.

5. The vertiport of claim 3, wherein the marking portion comprises a beacon configured to transmit non-directional radio waves.

6. The vertiport of claim 1, wherein each of the elevating portions comprises:
  a rail installed upright in the lower space of the main body portion, the rail having a rack gear disposed on one side thereof;
  a support bracket disposed on one side of the elevating portion such that the rail penetrates therethrough;
  a first driving unit fixedly installed on the support bracket; and
  a first pinion gear connected to the first driving unit and engaged with the rack gear.

7. The vertiport of claim 6, wherein the ring-shaped portion further comprises a rotating portion configured to move the plurality of generators in a circumferential direction.

8. The vertiport of claim 7, wherein the rotating portion comprises:
  an external ring gear disposed on a lateral peripheral surface of the ring-shaped portion in the circumferential direction;
  a second driving unit fixedly installed on the support bracket; and
  a second pinion gear connected to the second driving unit and engaged with the external ring gear.

9. The vertiport of claim 6, wherein:
  the support bracket comprises a connection portion having a rolling member to connect the ring-shaped portion;
  the ring-shaped portion comprises a connection groove disposed in a circumferential direction of the ring-shaped portion; and
  the rolling member is configured to travel within the connection groove.

10. The vertiport of claim 1, further comprising a controller electrically connected to the door portion and the elevating portion and configured to control opening and closing of the door portion and raising and lowering of the ring-shaped portion by the elevating portion.

11. The vertiport of claim 10, wherein:
  the ring-shaped portion further comprises a rotating portion configured to move the plurality of generators in a circumferential direction; and
  the controller is electrically connected to the rotating portion and configured to drive the rotating portion and rotate the ring-shaped portion based on model information and state information of an aircraft to change the positions of the plurality of generators by a predetermined angle.

12. The vertiport of claim 1, wherein the plurality of generators comprises a wind turbine generator configured to produce electricity using wind generated during landing of an aircraft in the take-off and landing zone.

13. A method for landing an aircraft, the method comprising:
  determining whether the aircraft approaching a vertiport is a model of aircraft capable of generating power;
  opening a door portion of the vertiport and raising a ring-shaped portion and a plurality of generators in response to a determination that the aircraft is the model of aircraft capable of generating power, wherein the plurality of generators is disposed on the ring-shaped portion in a fixed position;
  generating electricity using the plurality of generators during an operation in which the aircraft lowers toward the vertiport; and
  lowering the ring-shaped portion and the plurality of generators and closing the door portion after the aircraft lands on a take-off and landing zone of the vertiport and is parked.

14. The method of claim 13, wherein determining whether the aircraft is the model of aircraft capable of generating power comprises:
  receiving coordinates regarding a disposition of each rotor of the aircraft from a center of the aircraft; and
  determining whether the aircraft is the model of aircraft capable of generating power based on the disposition of each rotor.

15. The method of claim 13, further comprising rotating the ring-shaped portion and moving the plurality of generators to an operating position that can increase electricity generation efficiency based on model information and state information of the aircraft.

16. The method of claim 13, wherein generating the electricity comprises generating the electricity by the plurality of generators using wind generated by the operation in which the aircraft lowers toward the vertiport.

17. A system for operating a vertiport to generate electricity, the system comprising:
  an aircraft comprising a rotor; and
  the vertiport comprising:
    a main body portion having a lower space and a flat surface;
    a take-off and landing zone disposed in the lower space and spaced apart from the main body portion by a predetermined gap, wherein the take-off and landing zone comprises an upper surface parallel with the flat surface of the main body portion;
    a door portion disposed in the gap and configured to open or close the gap;
    a plurality of elevating portions disposed to surround the take-off and landing zone in the lower space;
    a ring-shaped portion surrounding the take-off and landing zone and connected to the plurality of elevating portions, wherein the ring-shaped portion is configured to be elevated by the plurality of elevating portions; and
    a plurality of generators disposed on the ring-shaped portion in a fixed position and configured to be moved in a circumferential direction according to a location of the rotor of the aircraft;
  wherein the vertiport is configured to switch between a basic mode and a power generation mode;
  wherein, in the basic mode, the door portion is in a closed state and the ring-shaped portion and the plurality of generators are in a lowered state and are situated in the lower space; and
  wherein, in the power generation mode, the door portion is in an open state, the ring-shaped portion and the plurality of generators are in a raised state, and the plurality of generators are exposed externally within the gap.

18. The system of claim 17, wherein the take-off and landing zone comprises a marking portion configured to provide a reference position and a reference direction to enable the aircraft to land with a constant position and a constant direction.

19. The system of claim 17, wherein the elevating portion comprises:
- a rail installed upright in the lower space of the main body portion, the rail having a rack gear disposed on one side thereof;
- a support bracket disposed on one side of the elevating portion such that the rail penetrates therethrough, the support bracket comprising a connection portion having a rolling member to connect the ring-shaped portion;
- a first driving unit fixedly installed on the support bracket; and
- a first pinion gear connected to the first driving unit and engaged with the rack gear.

20. The system of claim 19, wherein the ring-shaped portion further comprises:
- a rotating portion configured to move the plurality of generators in the circumferential direction;
- an external ring gear disposed on a lateral peripheral surface of the ring-shaped portion in the circumferential direction;
- a second driving unit fixedly installed on the support bracket;
- a second pinion gear connected to the second driving unit and engaged with the external ring gear; and
- a connection groove disposed in the circumferential direction of the ring-shaped portion, wherein the rolling member of the support bracket is configured to travel within the connection groove.

* * * * *